United States Patent [19]

Marsden

[11] Patent Number: 5,732,372
[45] Date of Patent: Mar. 24, 1998

[54] METHOD FOR DETERMINING A CENTER POSITION OF A VEHICLE STEERING SYSTEM

[75] Inventor: Douglas William Marsden, Dearborn Hts., Mich.

[73] Assignee: Ford Global Technologies, Inc., Dearborn, Mich.

[21] Appl. No.: 488,522

[22] Filed: Jun. 9, 1995

[51] Int. Cl.[6] ............................................... B62D 5/00
[52] U.S. Cl. ........................... 701/41; 180/412; 180/443
[58] Field of Search ...................... 364/424.051, 424.052; 180/443, 446, 408, 410, 412, 413, 421, 422; 701/41, 42

[56] References Cited

U.S. PATENT DOCUMENTS

| | | | |
|---|---|---|---|
| 4,621,833 | 11/1986 | Soltis | 280/707 |
| 4,722,545 | 2/1988 | Gretz et al. | 280/707 |
| 4,803,629 | 2/1989 | Noto et al. | 364/424.051 |
| 4,961,474 | 10/1990 | Daido et al. | 364/424.051 |
| 4,999,776 | 3/1991 | Soltis et al. | 364/424.051 |
| 5,032,996 | 7/1991 | Shiraishi | 364/424.051 |
| 5,065,323 | 11/1991 | Shiraishi et al. | 364/424.051 |
| 5,121,322 | 6/1992 | Shiraishi et al. | 364/424.051 |
| 5,243,188 | 9/1993 | Hattori et al. | 364/424.051 |
| 5,253,172 | 10/1993 | Ito et al. | 364/424.051 |
| 5,311,432 | 5/1994 | Momose | 364/424.051 |
| 5,422,810 | 6/1995 | Brunning et al. | 364/424.051 |
| 5,434,784 | 7/1995 | Bradley et al. | 364/424.051 |
| 5,465,210 | 11/1995 | Walenty | 364/424.051 |

FOREIGN PATENT DOCUMENTS

| | | |
|---|---|---|
| 0321082 | 6/1989 | European Pat. Off. . |
| 0359673 | 3/1990 | European Pat. Off. . |
| 0546789 | 6/1993 | European Pat. Off. . |
| 4015618 | 11/1990 | Germany . |
| 4130142 | 3/1993 | Germany . |
| 3128768 | 5/1991 | Japan . |
| 42529112 | 9/1992 | Japan . |
| 6255530 | 9/1994 | Japan . |

*Primary Examiner*—Gary Chin
*Attorney, Agent, or Firm*—Mark L. Mollon, Esq.; Roger L. May, Esq.

[57] ABSTRACT

A method for determining a center position of a vehicle steering system, said method comprising the steps of reading a plurality of predetermined inputs. The method includes the steps of roughly estimating a center position of the vehicle steering system after the vehicle begins moving based upon the read predetermined inputs and determining whether the steering wheel of the vehicle steering system is approximately straight. The method further includes the steps of accurately estimating a center position of the vehicle steering system if the steering wheel of the vehicle steering system is approximately straight and concluding that the accurately estimated center position is the center position of the vehicle steering system if the steering wheel of the vehicle steering system is approximately straight and Concluding that the roughly estimated center position is the center position of the vehicle steering system if the steering wheel of the vehicle steering system is not approximately straight.

17 Claims, 4 Drawing Sheets

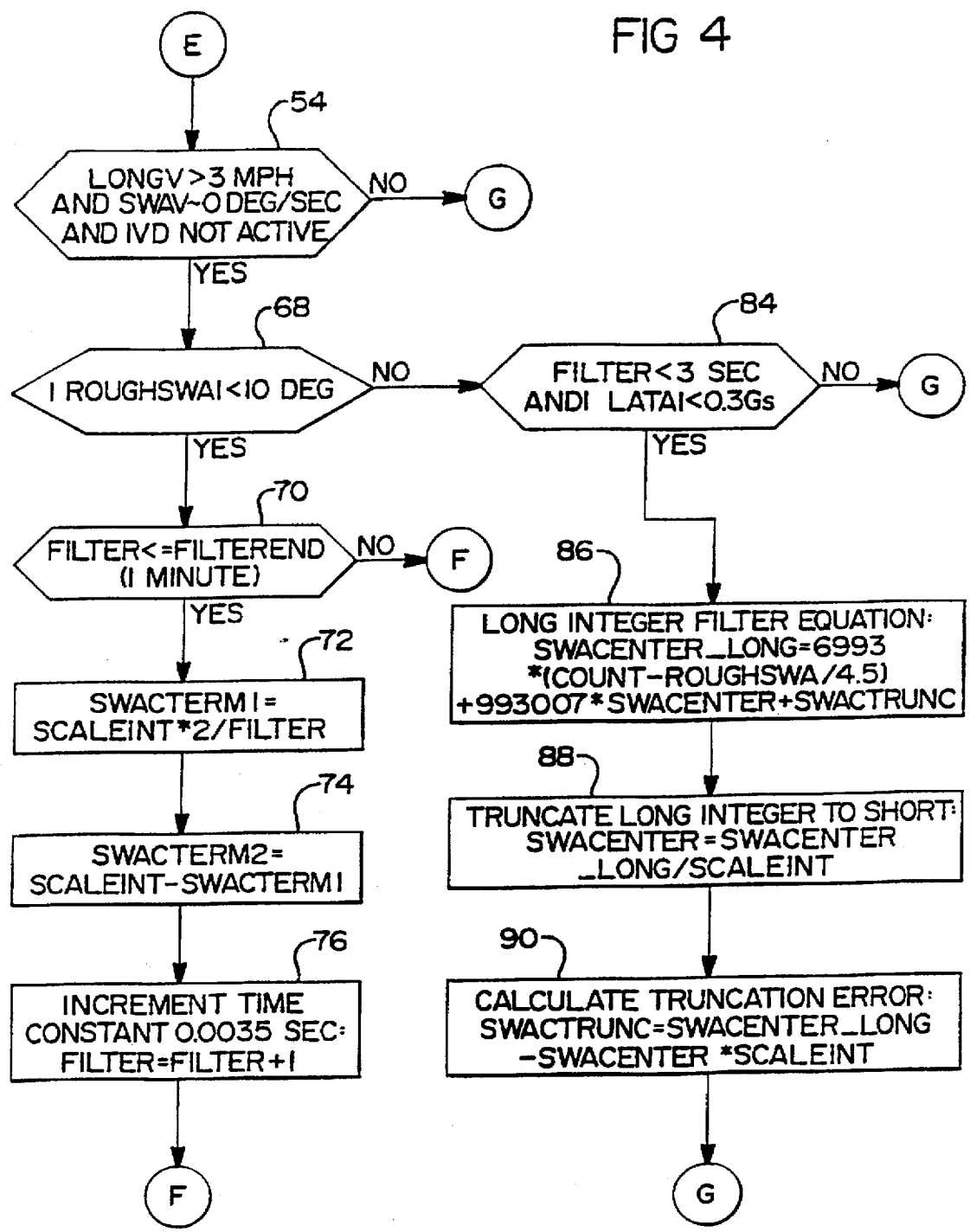

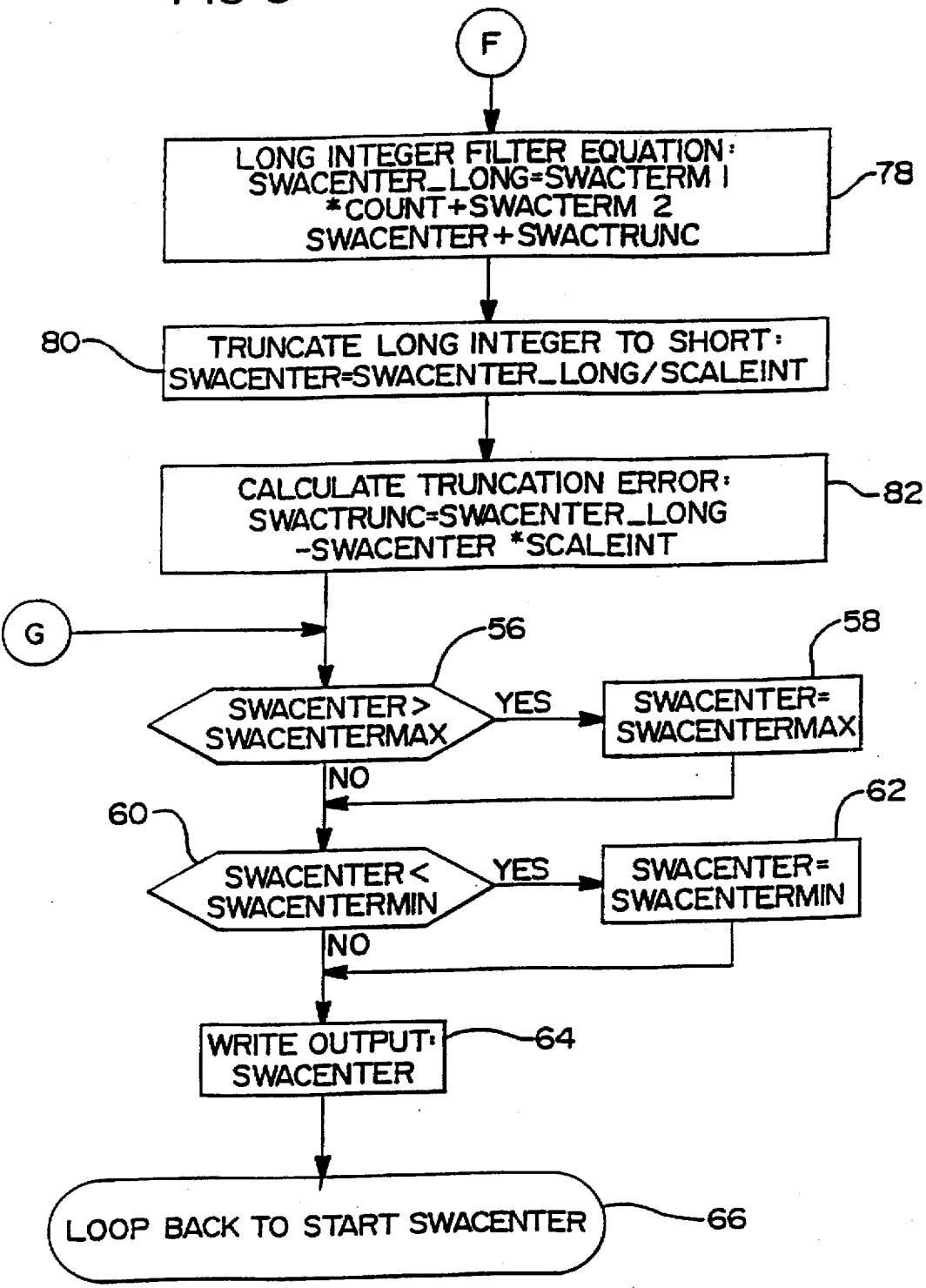

METHOD FOR DETERMINING A CENTER POSITION OF A VEHICLE STEERING SYSTEM

BACKGROUND OF THE INVENTION

1. Field of the Invention

The present invention relates generally to vehicle steering systems and, more specifically, to a method for determining a center position of a vehicle steering system.

2. Description of the Related Art

It is known to provide a method and apparatus for determining a center position of a steering system for a motor vehicle such as an automotive vehicle. An example of such a method and apparatus is disclosed in U.S. Pat. No. 4,999,776 to Soltis et al. This patented method and apparatus includes a steering sensor for sensing the position of the vehicle steering system with reference to a predetermined, but adjustable, center position and for defining two windows of operation of the vehicle steering system. The windows of operation include a first relatively moveable window which generally tracks the instantaneous position of the vehicle steering system and a second relatively fixed window having a location which is resettable only after at least one time dependent condition has been satisfied. The patented method and apparatus also includes a first timer for determining the amount of time the vehicle steering system has been operated within the moveable window as well as a second timer for determining the amount of time the vehicle steering system has been operated within the fixed window. Although the above-patented method and apparatus has worked well, there is a need in the art to determine the center position of the vehicle steering system more quickly and at a much lower speed of the vehicle.

SUMMARY OF THE INVENTION

Accordingly, the present invention is a method for determining a center position of a vehicle steering system. The method includes the steps of reading a plurality of predetermined inputs and setting a minimum center position and maximum center position for the vehicle steering system based on a count of rotation of a steering wheel of the steering system. The method includes the steps of determining whether predetermined conditions have been met based on the read predetermined inputs and calculating a center position of the vehicle steering system based on the read predetermined inputs if the predetermined conditions have been met. The method further includes the steps of determining whether the calculated center position is within the minimum center position and maximum center position and concluding that the calculated center position is the center position of the vehicle steering system if the calculated center position is within the minimum center position and maximum center position.

One advantage of the present invention is that an improved method is provided for determining a center position of a vehicle steering system. Another advantage of the present invention is that the method determines the center position of the steering system while the motor vehicle is in a turn. Yet another advantage of the present invention is that the method determines the center position of the steering system for a motor vehicle more quickly and at a much lower speed of the vehicle. Still another advantage of the present invention is that the method determines the center position of the steering wheel angle based on input from a vehicle yaw velocity sensor and other inputs of calculated relative steering wheel angle since ignition key-ON. A further advantage of the present invention is that the method does not rely on ride height sensor input from suspension units of the motor vehicle.

Other features and advantages of the present invention will be readily appreciated as the same becomes better understood after reading the subsequent description taken in conjunction with the accompanying drawings.

BRIEF DESCRIPTION OF THE DRAWINGS

FIGS. 3 through 5 are flowcharts of a method, according to the present invention, for determining a center position of the steering system for the motor vehicle of FIG. 1.

DESCRIPTION OF THE PREFERRED EMBODIMENT(S)

Figure 1:
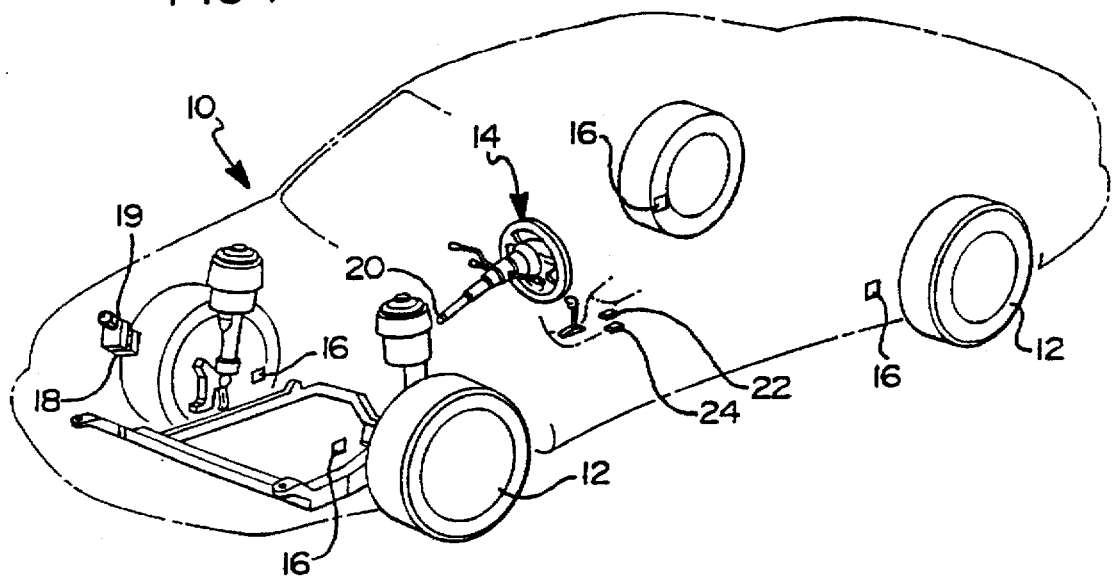
FIG. 1 is a perspective view of a motor vehicle employing a method, according to the present invention, for determining a center position of a steering system partially illustrated for the motor vehicle.
Figure 2:
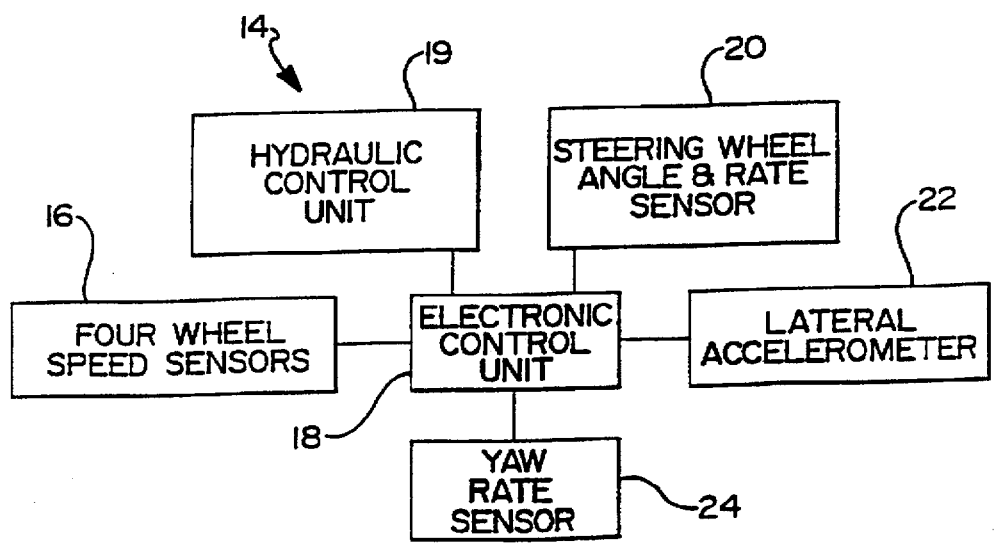
FIG. 2 is a block diagram of the steering system for the motor vehicle of FIG. 1 for carrying out the method according to the present invention.

Referring to FIG. 1, one embodiment of a motor vehicle 10 such as an automotive vehicle is partially shown. The motor vehicle 10 includes wheels 12 and a steering system, generally indicated at 14, for controlling the angle of the wheels 12. The steering system includes a wheel speed sensor 16 for each of the wheels 12 to sense the rotational velocity of the wheels 12. The steering system 14 includes an electronic control unit such as a brake control module for outputting commands to a hydraulic control unit 19 for controlling a brake system (not shown) of the motor vehicle 10. The steering system 14 also includes a steering (wheel angle and rate) sensor 20, a lateral accelerometer 22 and a yaw rate sensor 24.

The steering sensor 20 includes means for measuring an excursion angle of the steering system 14 from a center position determined by the steering sensor 20 in conjunction with the electronic control unit 18 as well as means, again in conjunction with the electronic control unit 18, for measuring an angular velocity which the steering system 14 (e.g., the steering shaft) is being operated. Such a steering sensor 20 is disclosed in U.S. Pat. No. 4,621,833. The steering sensor 20 includes a shutter wheel attached to a steering shaft, which shaft rotates in unison with a steering wheel as the steering wheel is turned by a driver of the motor vehicle 10. The shutter wheel has a plurality of apertures which serve to trigger the activity of detectors as the shutter wheel is rotated with the steering wheel of the motor vehicle 10. The steering sensor 20 is a digital device which provides a two-bit signal a plurality of times during one revolution of the steering wheel and as a result each of the signal transitions indicates for this example, 4.5 degrees of rotation of the steering wheel. A further discussion of the steering sensor 20 may be found in U.S. Pat. Nos. 4,722,545, 4,621,833 and 4,999,776.

The lateral accelerometer 22 measures the lateral acceleration of the motor vehicle 10. The yaw rate sensor 24 measures the yaw velocity about the z axis of the motor vehicle 10.

The electronic control unit 18 receives inputs from the wheel sensors 16, steering sensor 20, lateral accelerometer 22 and yaw rate sensor 24. In return, the electronic control unit 18 outputs commands to the hydraulic control unit 19 for controlling the brake system of the motor vehicle 10.

Those skilled in the art will appreciate in view of this disclosure that the processor within the electronic control unit 18 and its associated peripheral equipment could be structured according to several different architectures. In this embodiment, however, the processor is configured so that a control program is sequentially read for each unit command from a read-only memory (ROM) which stores preset control programs. Unit commands are executed by a central processing unit (CPU). The processor integrally includes an input-output control circuit (I/O) for exchanging data with external devices and a random access memory (RAM) for temporarily holding data while the data is being processed.

Figure 3:
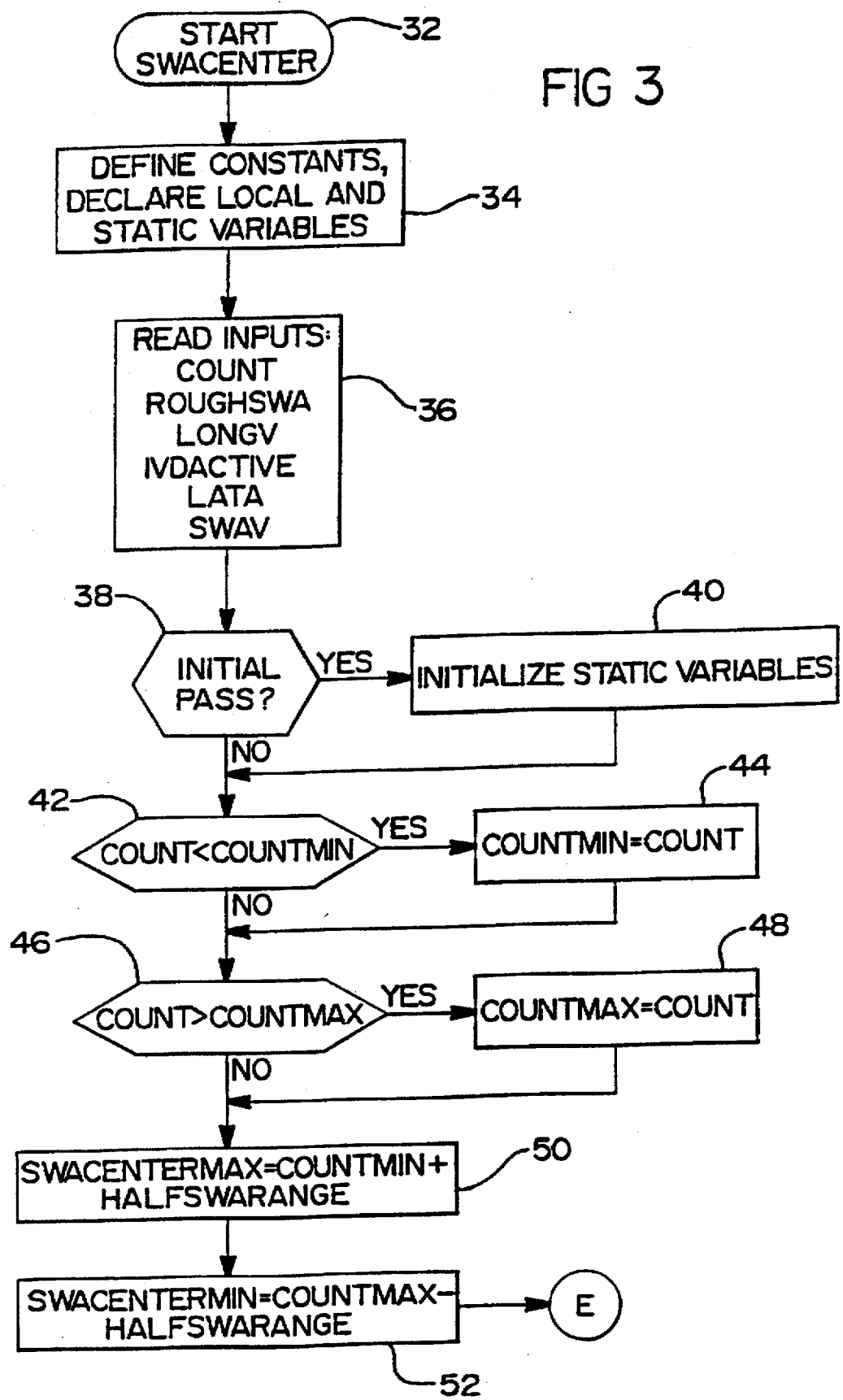

Referring to FIGS. 3 through 5, a flowchart of a method, according to the present invention, for determining a center position of the steering system 14 is shown. The method starts in bubble 32 and advances to block 34 and defines constants and declares local and static variables. For example, the method defines constants such as short to long integer scaling factor (SCALEINT), final filter constant (FILTEREND) and slightly more than half steering range (HALFSWARRANGE). Also, local variables such as steering sensor counts (COUNT), vehicle longitudinal velocity (LONGV), yaw velocity (YAWV), estimated steering wheel angle based on LONGV and YAWV (ROUGHSWA), brake control active (IVDACTIVE), vehicle lateral acceleration (LATA), steering wheel angular velocity (SWAV) are defined. Further, the static variables such as steering wheel angle center (SWACENTER), filter setting (FILTER), maximum value of counts (COUNTMAX), minimum value of counts (COUNTMIN), maximum value of steering wheel angle center position (SWACENTERMAX), minimum value of steering wheel angle center position (SWACENTERMIN), first factor in steering center calculation (SWACTERM1), second factor in steering center calculator (SWACTERM2), and error term from truncation of steering center from long to short (SWACTRUNC) are defined.

From block 34, the method then advances to block 36 and reads the inputs such as COUNT, ROUGHSWA, LONGV, IVDACTIVE, LATA AND SWAV. The electronic control unit 18 reads a digital signal from the steering sensor 20 and reads an analog signal (YAWV) from the yaw rate sensor 24. The electronic control unit 18 estimates LONGV based on the input from the four wheel speed sensors 16 wherein for this example, one unit equals 0.01 kilometers/hour and estimates ROUGHSWA using LONGV and YAWV and linear interpolation from a 2-D look-up table. The electronic control unit 18 reads an analog signal (LATA) from the lateral accelerometer 22 and checks the IVDACTIVE variable to see if the hydraulic control unit 19 is being actuated.

From block 36, the method advances to block 38 and determines whether this is the first pass through the algorithm, for example, by checking an initialization flag. If so, the method advances to block 40 and initializes the static variables wherein FILTER is initiated for this example, at one second and all other static variables are initiated at zero (0). After block 40 or if this is not the first pass of the method, the method advances to block 42 and determines whether the COUNT is less than (COUNTMIN) which is initially set to zero (0). If so, the method advances to block 44 and sets COUNTMIN equal to COUNT. After block 44 or if COUNT is not less than COUNTMIN, the method advances to block 46 and includes the step of determining whether COUNT is greater than COUNTMAX which is initially set to zero (0). If so, the method advances to block 48 and sets COUNTMAX equal to COUNT. After block 48 or if COUNT is not greater than COUNTMAX, the method advances to block 50. It should be appreciated that based on the maximum and minimum steering rotation since start-up or key-ON of the motor vehicle 10 and knowledge of full steering travel (e.g. 920 degrees), the bounds on feasible center positions of the steering system 14 can be calculated.

In block 50, the method sets the static variable SWACENTERMAX equal to COUNTMIN plus HALFSWARANGE which is slightly more than half of the full range of the steering wheel, lock to lock. The method then advances to block 52 and sets the static variable SWACENTERMIN equal to COUNTMAX minus HALFSWARANGE. The method advances to block 54 and determines whether the read input LONGV is greater than a predetermined velocity, such as three miles per hour (3 m.p.h.), and the read input SWAV is approximately zero degrees per second and IVDACTIVE is false. The algorithm filters the steering wheel center when vehicle speed is above 3 m.p.h., steering wheel velocity is approximately zero (0) and the electronic control unit 18 is not actively controlling the hydraulic control unit 19 for the brake system of the motor vehicle 10. If not, the method advances to block 56 (FIG. 5) to ensure the best estimate of the center position is within the known feasible boundaries (this is most important shortly after start-up and before the filter has been running long). The method determines whether the static variable SWACENTER is greater than the static variable SWACENTERMAX. If so, the method advances to block 58 and sets the static variable SWACENTER equal to the static variable SWACENTERMAX. After block 58 or if the static variable SWACENTER is not greater than the static variable SWACENTERMAX, the method advances to block 60 and determines whether the static variable SWACENTER is less than the static variable SWACENTERMIN. If so, the method advances to block 62 and sets the static variable SWACENTER equal to the static variable SWACENTERMIN. After block 62 or if the static variable SWACENTER is not less than the static variable SWACENTERMIN, the method advances to block 64 and writes the output of the static variable SWACENTER for use by the electronic control unit 18 for controlling the hydraulic control unit 19 for brake system of the motor vehicle 10. The methodology then advances to bubble 66 and loops back to bubble 32 to start the method again and adjust SWACENTER.

In block 54, if LONGV is greater than 3 m.p.h., SWAV is approximately zero and IVDACTIVE is false, the method advances to block 68 and determines whether the motor vehicle 10 is driving approximately straight. The electronic control unit 18 determines whether the absolute value of ROUGHSWA is less than a predetermined value, such as ten degrees (10°). If so, the method advances to block 70 to set up the filter parameters in preparation for a slower responding, but more accurate, calculation of the steering center based on the steering count through a moving pole filter. The electronic control unit 18 determines whether FILTER is less than or equal to FILTEREND which for this example, is one minute. If so, the method advances to block 72 and sets SWACTERM1 equal to SCALEINT*2/FILTER to establish one time constant and advances to block 74 and sets SWACTERM2 equal to SCALEINT minus SWACTERM1. The method then advances to block 76 and increments time constant by half of the loop time such as 0.0035 sec by setting FILTER equal to FILTER plus one (1). While the conditions in blocks 54 and 68 are satisfied, the FILTER time constant is incremented along with real time (one second of time goes by and FILTER increments one second). By using the term 2/FILTER, this cuts the incrementation rate of the FILTER time constant to half of real time. After block 76 or if FILTER is not less than or equal to FILTER-END in block 70, the method advances to block 78 in FIG. 5.

In block 78, the method calculates SWACENTER using a long integer filter equation. The calculation of the center position of the steering wheel angle is based on a low pass filter with increasing time constant starting at 0.5 seconds and ending at sixty (60) seconds. The method calculates SWACENTER as follows:

SWACENTER_long=(SWACTERM1*COUNT)+
(SWACTERM2*SWACENTER)+SWACTRUNC.

The method advances to block 80 and truncates long integer to short:

SWACENTER=SWACENTER_long/SCALEINT.

The method then advances to block 82 and calculates a truncation error:

SWACTRUNC=SWACENTER_long−
(SWACENTER*SCALEINT).

The method then advances to block 56 previously described. It should be appreciated that SWACENTER_long is a thirty-two (32) bit value and SWACENTER is a sixteen (16) bit value and that the truncation error is saved in memory.

Returning to block 68 in FIG. 4, if the absolute value of ROUGHSWA is not less than the predetermined amount, such as ten degrees (10°), the method advances to block 84 and determines whether FILTER is less than a predetermined value, such as three (3) seconds, and the absolute value of LATA is less than a predetermined value such as 0.3G's. If LATA is greater than 0.3G's, the tires begin operating in a non-linear region and the 2-D look-up table used to calculate ROUGHSWA is not sufficiently accurate. If conditions in block 84 are not satisfied, the method advances to block 56 previously described. If conditions in block 84 are satisfied, the method advances to block 86 because the method may not yet have found center using the slower responding, but more accurate, method and uses a faster responding, but less accurate, method. The faster method uses the steering wheel angle estimate (ROUGHSWA) through a one (1) Hz filter to calculate what the steering center should be. The method calculates the SWACENTER_long according to a long integer filter equation:

SWACENTER_long=6993*(COUNT-ROUGHSWA/4.5)+
993007*SWACENTER+SWACTRUNC.

The method advances to block 88 and truncates long integer to short as follows:

SWACENTER=SWACENTER_long−
(SWACENTER*SCALEINT).

After block 88, the method advances to block 56 previously described. It should be appreciated that the method recalculates and adjusts the center position of the steering system 14 every loop.

The present invention has been described in an illustrative manner. It is to be understood that the terminology which has been used is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A method for determining a center position of a vehicle steering system, said method comprising the steps of:

reading a plurality of predetermined inputs from a group comprising steering sensor counts, vehicle longitudinal velocity, vehicle yaw velocity, brake control, vehicle lateral acceleration and steering wheel angular velocity;

reading a count of the steering sensor counts;

determining whether the read count is less than a minimum count, setting the minimum count to the read count if the read count is less than the minimum count, determining whether the read count is greater than a maximum count if the read count is not less than the minimum count, and setting the maximum count equal to the read count if the read count is greater than the maximum count;

setting a minimum center position and maximum center position for the vehicle steering system based on the minimum count and the maximum count;

determining whether predetermined conditions have been met based on the read predetermined inputs;

calculating a center position of the vehicle steering system based on said vehicle longitudinal velocity and said vehicle yaw velocity of the read predetermined inputs if the predetermined conditions have been met;

determining whether the calculated center position is within the minimum center position and the maximum center position; and concluding that the calculated center position is the center position of the vehicle steering system if the calculated center position is within the minimum center position and the maximum center position.

2. A method as set forth in claim 1 including the step of determining whether the method is on its first pass through the method after said step of reading.

3. A method as set forth in claim 2 including the step of initializing predetermined variables if the method is on its first pass through the method.

4. A method as set forth in claim 1 wherein said step of setting comprises setting the maximum center position equal to the minimum count plus half of a count range of rotation of the steering wheel and setting the minimum center position equal to the maximum count minus half of the count range of rotation of the steering wheel.

5. A method as set forth in claim 1 including the step of determining whether the steering wheel of the vehicle steering system is relatively straight after said step of determining whether predetermined conditions have been met.

6. A method as set forth in claim 5 wherein said step of determining whether the steering wheel of the vehicle steering system is relatively straight comprises reading said predetermined inputs of said vehicle longitudinal velocity and said vehicle yaw velocity to obtain an estimated center position of the vehicle steering system and determining whether an absolute value of the estimated center position is within a range between the minimum count and the maximum count.

7. A method as set forth in claim 6 including the step of filtering, the calculated center position of the vehicle steering system to obtain a more accurate calculation of the center position.

8. A method as set forth in claim 1 wherein said step of determining whether predetermined conditions have been met comprises determining whether said vehicle longitudinal velocity of the vehicle is less than a predetermined velocity and said steering wheel angular velocity is approximately zero and a control module is not activating hydraulic units of a brake system of a motor vehicle.

9. A method as set forth in claim 1 wherein said step of calculating comprises calculating the center position based on a first predetermined constant multiplied by the read count of rotation of the steering wheel and added to a second predetermined constant multiplied by the previous calculated center position.

10. A method as set forth in claim 1 wherein said step of calculating comprises calculating the center position based on the read count minus the estimated center position divided by one of the read count multiplied by a predetermined constant.

11. A method as set forth in claim 1 wherein said step of determining whether the calculated center position is within the minimum center position and the maximum center position comprises determining whether the calculated center position is greater than the maximum center position, setting the calculated center position equal to the maximum center position if the calculated center position is not greater than the maximum center position, determining whether the calculated center position is less than the minimum center position if the calculated center position is not greater than the maximum center position, and setting the calculated center position equal to the minimum center position if the calculated center position is less than the minimum center position.

12. A method for determining a center position of a vehicle steering system, said method comprising the steps of:

reading a plurality of predetermined inputs from a group comprising steering sensor counts, vehicle longitudinal velocity vehicle yaw velocity, brake control, vehicle lateral acceleration and steering wheel angular velocity and calculating an estimated center position of the vehicle steering system based on said vehicle longitudinal velocity and said vehicle yaw velocity;

determining whether the read count is less than a minimum count, setting the minimum count to the read count if the read count is less than the minimum count, determining whether the read count is greater than a maximum count if the read count is not less than the minimum count, and setting the maximum count equal to the read count if the read count is greater than the maximum count;

setting a minimum center position and maximum center position for the vehicle steering system based on the minimum count and the maximum count;

determining whether predetermined conditions have been met based on the read predetermined inputs;

calculating a center position of the vehicle steering system based on said estimated center position if the predetermined conditions have been met;

determining whether the calculated center position is greater than the maximum center position, setting the calculated center position equal to the maximum center position if the calculated center position is greater than the maximum center position, determining whether the calculated center position is less than the minimum center position if the center position is not greater than the maximum center position, and setting the calculated center position equal to the minimum center position if the calculated center position is less than the minimum center position;

concluding that the calculated center position is the center position of the vehicle steering system if the calculated center position is within the minimum center position and the maximum center position.

13. A method as set forth in claim 12 wherein said step of setting comprises setting the maximum center position equal to the minimum count plus half of a count range of rotation of the steering wheel and setting the minimum center position equal to the maximum count minus half of the count range.

14. A method as set forth in claim 12 including the step of filtering the calculated center position of the vehicle steering system to obtain a more accurate calculation of the center position.

15. A method as set forth in claim 12 wherein said step of calculating comprises calculating the center position based on the read count minus the estimated center position divided by one of the read count multiplied by a predetermined constant.

16. A method as set forth in claim 12 wherein said step of determining whether predetermined conditions have been met comprises determining whether said vehicle longitudinal velocity of the vehicle is less than a predetermined velocity and said steering wheel angular velocity is approximately zero and a control module is not activating hydraulic units of a brake system of a motor vehicle.

17. A method for determining a center position of a vehicle steering system, said method comprising the steps of:

reading a plurality of predetermined inputs from a group comprising steering sensor counts, vehicle longitudinal velocity, vehicle yaw velocity, brake control, vehicle lateral acceleration and steering wheel angular velocity;

reading a count of the steering sensor counts;

determining whether the read count is less than the minimum count, setting the minimum count to the read count if the read count is less than the minimum count, determining whether the read count is greater than the maximum count if the read count is not less than the minimum count, and setting the maximum count equal to the read count if the read count is greater than the maximum count;

setting a minimum center position and a maximum center position for the vehicle steering system based on the minimum count and the maximum count;

roughly estimating a center position of the vehicle steering system based on said vehicle longitudinal velocity and said vehicle yaw velocity of the read predetermined inputs after the vehicle begins moving;

determining whether the steering wheel of the vehicle steering system is approximately straight;

finely estimating a center position of the vehicle steering system if the steering wheel of the vehicle steering system is approximately straight; and concluding that the finely estimated center position is the center position of the vehicle steering system if the steering wheel of the vehicle steering system is approximately straight and the finely estimated center position is within the minimum center position and the maximum center position; and concluding that the roughly estimated center position is the center position of the vehicle steering system if the steering wheel of the vehicle steering system is not approximately straight and the roughly estimated center position is within the minimum center position and the maximum center position.

* * * * *